March 30, 1926.  
W. A. HEATH  
HAND TRUCK  
Filed Dec. 8, 1924  
1,578,602  
2 Sheets-Sheet 1
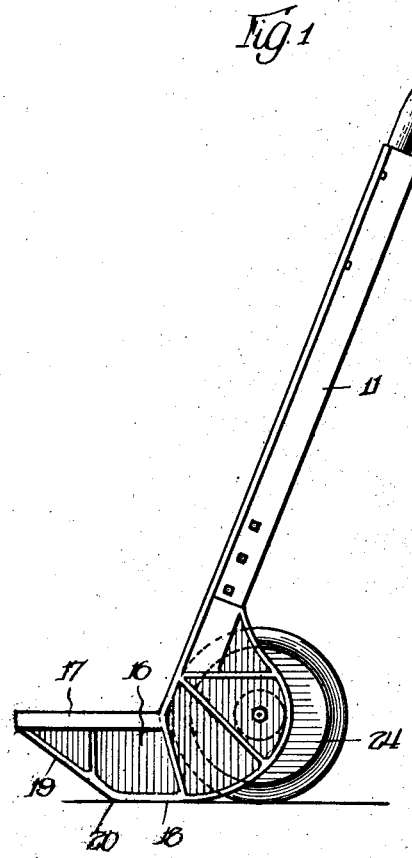
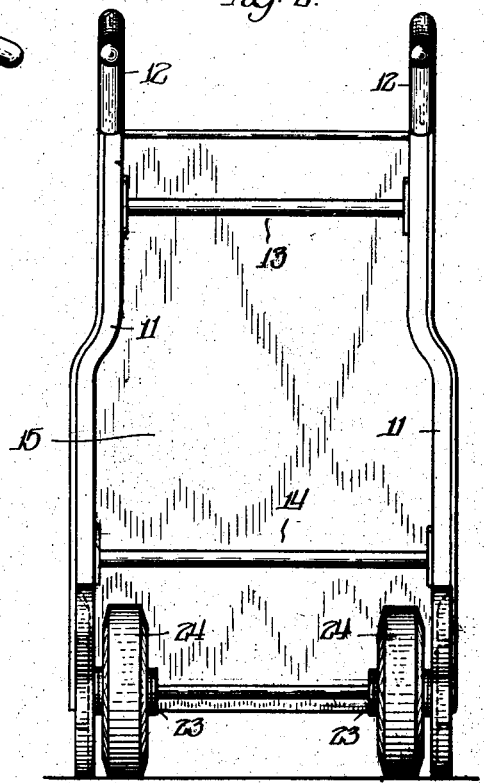
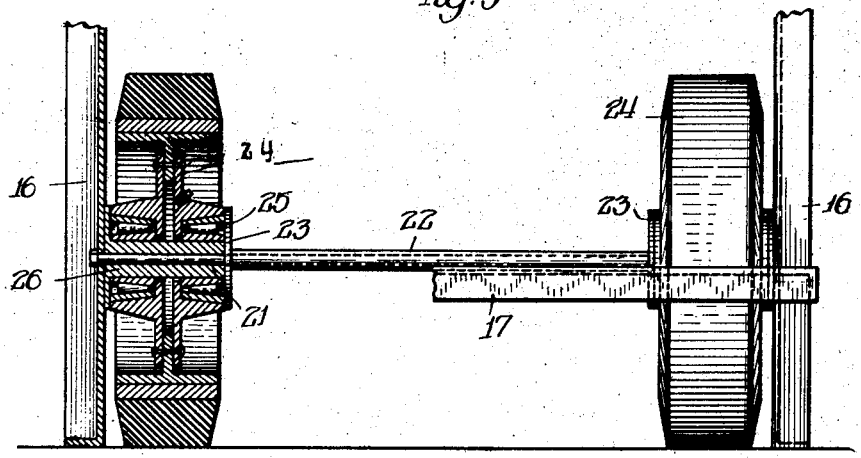
Witness:  
R. Burkhardt.
Inventor:  
Walter A. Heath,  
By L. Anthony Ursin  
atty.

March 30, 1926. 1,578,602
W. A. HEATH
HAND TRUCK
Filed Dec. 8, 1924   2 Sheets-Sheet 2
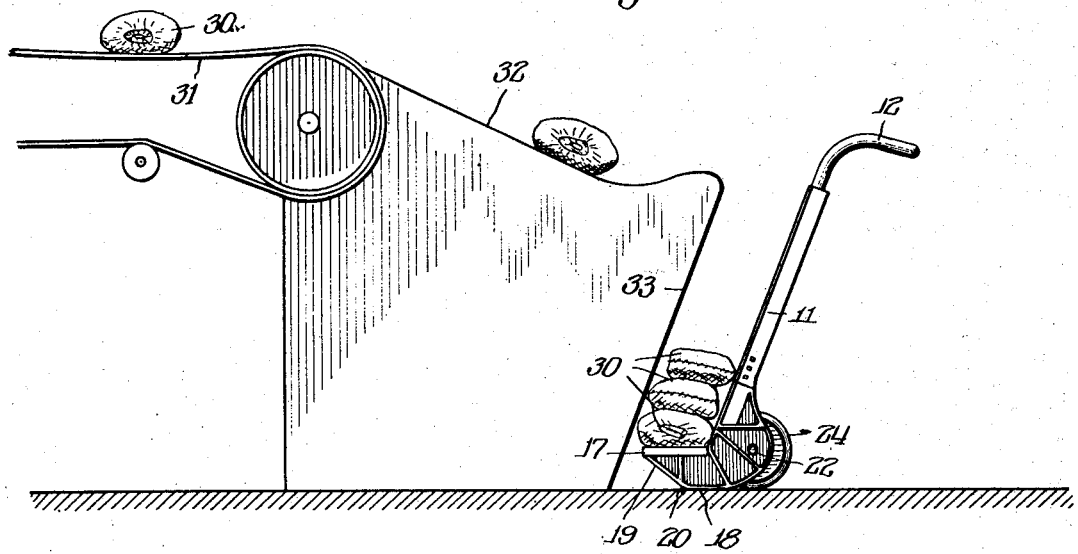
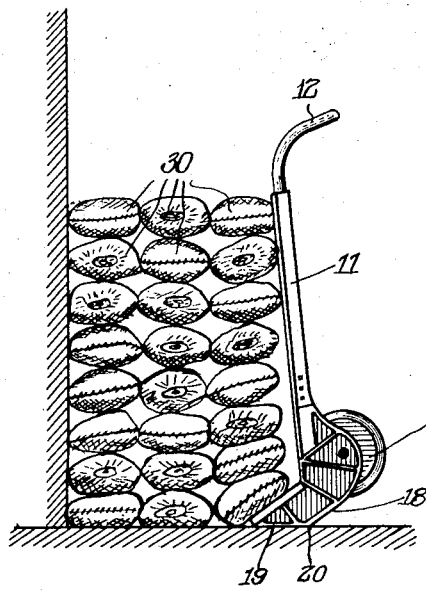 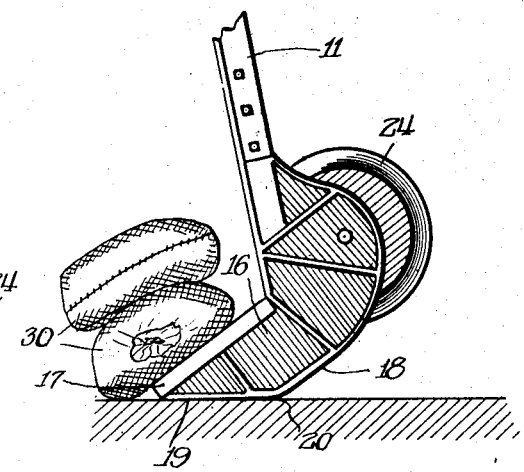
Witness:
R. Burkhardt
Inventor:
Walter A. Heath, Patented Mar. 30, 1926.

1,578,602

UNITED STATES PATENT OFFICE.

WALTER A. HEATH, OF CHICAGO, ILLINOIS.

HAND TRUCK.

Application filed December 8, 1924. Serial No. 754,543.

*To all whom it may concern:*

Be it known that I, WALTER A. HEATH, a citizen of the United States, residing at Chicago, in the county of Cook and State of Illinois, have invented certain new and useful Improvements in Hand Trucks, of which the following is a specification.

This invention relates to a new and improved truck and more particularly, to a hand truck especially adapted for the handling of sacked cement or similar material.

As now commercially produced, the sacked cement is delivered over a chute from which it is loaded on to a truck by hand. The truck is braced by the body of the workman and held adjacent the chute and the sacks are pulled over the edge of the chute and dropped by gravity to pile one upon the other upon the truck. With usual types of trucks having flat aprons, it is necessary in dumping the truck to throw it well beyond the vertical and to swing the truck from side to side to get the apron out from under the sacks. The sacks are not piled vertically, but at an angle with a consequent loss of storage space in the warehouse or freight car into which they are dumped from the truck.

It is an object of the present invention to provide a truck adapted for the handling of sacked material and adapted to dump the sacks into a substantially vertical pile and to be freed from the dumped sacks by but slight effort.

It is a further object to provide a truck of this character provided with a flat surface adapted to cooperate with the wheels to form supports for the truck, so that it will stand when loaded.

Other and further objects will appear as the description proceeds.

I have illustrated a preferred form of truck together with the method of operation in the accompanying drawings, in which—

Figure 1 is a side view of a truck;

Figure 2 is a view of Figure 1 as seen from the right;

Figure 3 is a fragmentary view partly in section, showing the wheel construction;

Figure 4 is a view illustrating the method of loading the trucks;

Figure 5 is a view illustrating the method of dumping the trucks, and—

Figure 6 is a fragmentary view on an enlarged scale, showing the action in dumping the truck.

The truck comprises the side frame members 11 from the upper ends of which extend the handles 12. The members 11 are connected by the cross frame members 13 and 14 as shown in Figure 2. The cover plate 15 is secured to the truck frame. To the lower ends of the members 11 are secured the rocker plates 16. These plates receive the apron or toe-plate 17. The rocker plates are provided with a flat surface 18 joined to a forward flat surface 19 by the short arc 20. The axle 21 connects the two rocker plates 16 and carries the separator 22, which has the two flat bearings 23 engaging the wheels. The wheels 24 are hown as carried upon roller bearings 25, the latter bearing against the spindle 26 carried by the axle 21.

As is shown in Figure 1, the flat surface 18 of the rocker plate is so related to the wheels 24 that the truck will stand by resting on the surface 18 in combination with the wheels. Referring now to Figure 4, the sacks of cement 30 are delivered by belt conveyor 31 to the discharge chute 32. This chute 32 is connected to the inclined loading face 33. As will be apparent from an examination of Figure 4, the surface 33 is located substantially parallel to the cover plate, or main body of the truck when the truck is brought adjacent the chute for loading and lowered to be supported upon the flat surfaces 18 and wheels 34.

The workman standing behind the truck reaches forward over the truck and drags the sacks of cement over the edge of the chute so that they drop upon the truck in the manner shown. When the truck has received a normal load, the center of gravity is very nearly over the axle and in advance of it. It therefore requires but slight labor to tilt the truck backward, so as to clear the surface 18 from the ground.

The truck is then wheeled to the point where the sacks are to be piled. It is then swung forward until the surface 18 engages the ground and but slight effort is then necessary to swing it forward over the rounded surface 20 and to bring the flat surface 19 into engagement with the bar. The weight of the sacks of cement upon the apron or toe-plate 17 has a squeezing or pinching action upon the forward portion of the truck due to the angular relation of the toe-plate 17 and the bearing surfaces 19. The toe-plate is thus practically squeezed out from under the sacks by the weight of the load, and therefore, little effort is required to clear the truck from the dumped load. It is cleared by a single quick dumping motion and there is no necessity for twisting and pulling to get the truck clear, as is the case with usual types of trucks having flat toe-plates brought flatly in contact with the floor.

My improved truck not only minimizes the amount of actual labor required from the workman handling the truck, but enables him to accomplish loading, and more particularly, dumping with a less expenditure of time. It also enables the sacks to be dumped in a pile substantially vertical and there is no disruption of the pile by pulling out the bottom sack while swinging or twisting a truck to get its toe-plate out from under the sack. The truck therefore, minimizes labor cost and also permits the storage of a greater number of sacks in a smaller storage space.

I have shown one preferred form of construction in detail, but it is to be understood that I contemplate such changes and modifications as come within the spirit and scope of the appended claims.

I claim:

1. In a hand truck, a truck body, wheels secured to the truck, rocker members secured to the lower portion of the truck and a toe-plate extending across the rocker members, the rocker members having bearing portions adapted to engage the ground in advance of the wheels to support the truck together with the wheels while the truck is in a loading position, with the toe-plate horizontal, and additional bearing surfaces located in advance of the first bearing surfaces and having an angular relation therewith, the latter bearing surfaces being adapted to engage the ground when the truck is swung to unloading position.

2. In a hand truck, a truck body, wheels secured to the truck, rocker members secured to the lower portion of the truck, bearing surfaces on the rocker members forward of the wheels adapted to engage the ground while the wheels touch the ground, additional bearing surfaces adapted to engage the ground when the truck is tilted forward, and a toe plate extending between the bearing members, the toe plate being substantially horizontal when the first bearing surface engage the ground and sloping toward the ground when the additional bearing surfaces engage the ground.

Signed at Chicago, Illinois, this third day of December. 1924.

WALTER A. HEATH.